United States Patent [19]

Gutekunst et al.

[11] 4,339,571
[45] Jul. 13, 1982

[54] ONE-COMPONENT SYSTEMS BASED ON CRYSTALLINE EPOXIDE RESINS

[75] Inventors: Ferdinand Gutekunst, Riehen; Hans Lehmann, Aesch; Rolf Schmid, Gelterkinden, all of Switzerland

[73] Assignee: Ciba-Geigy Corporation, Ardsley, N.Y.

[21] Appl. No.: 145,407

[22] Filed: May 1, 1980

[30] Foreign Application Priority Data

May 8, 1979 [CH] Switzerland ................... 4308/79

[51] Int. Cl.³ .................................... C08G 59/24
[52] U.S. Cl. ................................................ 528/361
[58] Field of Search ............... 525/507, 523; 528/91, 528/94, 361, 368, 93

[56] References Cited

U.S. PATENT DOCUMENTS

| 3,072,737 | 1/1963 | Chen | 528/91 X |
| 3,159,595 | 12/1964 | Parry | 528/91 X |
| 3,332,997 | 7/1967 | Renner et al. | 260/570.7 |
| 3,380,963 | 4/1968 | Thomas | 525/507 X |
| 3,635,843 | 1/1972 | Parry et al. | 260/2 N |
| 3,641,194 | 2/1972 | Schmid et al. | 260/835 |
| 3,677,978 | 7/1972 | Dowbenko et al. | 528/94 X |
| 3,739,041 | 6/1973 | Schmid et al. | 260/835 |
| 3,784,647 | 1/1974 | Fleming et al. | 528/91 X |
| 3,864,316 | 2/1975 | Robinson | 525/119 X |
| 3,896,082 | 7/1975 | Rensmann et al. | 528/94 |
| 3,910,908 | 10/1975 | Price | 528/368 X |
| 4,060,655 | 11/1977 | Johannes et al. | 428/35 |
| 4,161,575 | 7/1979 | Seymour et al. | 528/94 X |
| 4,181,643 | 1/1980 | Kreibich et al. | 260/40 R |

FOREIGN PATENT DOCUMENTS

| 915575 | 1/1963 | United Kingdom . |
| 1169639 | 11/1969 | United Kingdom . |
| 1169990 | 11/1969 | United Kingdom . |
| 1565379 | 4/1980 | United Kingdom . |

Primary Examiner—Earl A. Nielsen
Attorney, Agent, or Firm—Luther A. R. Hall

[57] ABSTRACT

One-component systems which are stable on storage and can be converted to crosslinked epoxide resins on heating and which contain a crystalline epoxide resin with, on average, more than one epoxide group per molecule and a melting point between 40° and 150° C., and, homogeneous distribution, a curing catalyst.

3 Claims, No Drawings

ONE-COMPONENT SYSTEMS BASED ON CRYSTALLINE EPOXIDE RESINS

The present invention relates to curable one-component systems which are based on crystalline epoxide resins and curing catalysts and are stable on storage and to the use of these systems for the preparation of mouldings, coatings or adhesive bonds.

As is known, mixtures of liquid diglycidyl ethers based on bisphenol A and curing agents having a catalytic action have only a short pot life for processing. For example, for a mixture of liquid bisphenol A diglycidyl ether with an epoxide content of 5.4 equivalents/kg and 2-ethyl-4-methylimidazole as the curing catalyst, this pot life is about 24 hours at room temperature, and at 40° C. this mixture has a maximum pot life of only 8 hours. Furthermore, it has been disclosed in German Offenlegungsschrift No. 2,405,111 and German Offenlegungsschrift No. 2,557,278 that one-component systems which are in the form of powder coatings and are stable on storage can be prepared from solid epoxide resins based on bisphenol A or bisphenol F, which are in the glass-like state and pass into the softening state only on heating, and imidazole or its derivatives, the said one-component systems being suitable for the production of coatings on metals by the electrostatic spraying process or the whirl-sintering process. However, relatively high temperatures of, on average, above 200° C. are required to effect curing of these one-component systems, so that these one-component systems are not suitable for coating, or for producing an adhesive bond on, non-metallic materials, for example plastics or wood.

It has now been found that curable one-component systems which are stable on storage and which can be cured at comparatively lower temperatures are obtained when crystalline epoxide resins are mixed intensively with a curing catalyst, preferably in the melt, and, if desired, the reaction mixture is then cooled to room temperature and allowed to crystallise out.

The present invention thus relates to one-component systems which are obtained from solid epoxide resins, curing catalysts and also, if desired, conventional additives in the solid form and are stable on storage and can be converted to crosslinked epoxide resins on heating, which one-component systems contain, as the solid epoxide resin, a crystalline epoxide resin with, on average, more than one epoxide group in the molecule and a melting point between 40° and 150° C.

Preferably, the one-component system according to the invention contains a crystalline epoxide resin with a melting point between 60° and 100° and also contains the curing catalyst in amounts of 2 to 8% by weight.

Examples of crystalline epoxide resins suitable for the one-component system according to the invention are: diglycidyl isophthalate, diglycidyl oxalate, diglycidyl fumarate, diglycidyl succinate, diglycidyl adipate, diglycidyl sebacate, triglycidyl benzene-1,3,5-tricarboxylate, tetraglycidyl pyromellitate, glycidyl 3-glycidyloxybenzoate, 1,3-diglycidyl-5,5-pentamethylenehydantoin, 1,1-methylene-bis-(3-glycidyl-5,5-dimethylhydantoin), triglycidyl isocyanurate, triglycidyl cyanurate, hydroquinone diglycidyl ether, isopropoxydiglycidyl cyanurate, diglycidyldiacetyl-p-phenylenediamine, diglycidyldiacetylbenzidine, diglycidyl-2,4-diacetyldiaminotoluene, diglycidylmaleic acid dianilide, adipic acid diglycidyl-anilide and sebacic acid diglycidyl-anilide.

Further suitable crystalline epoxide resins are those which are obtained by forming an adduct from an acid aliphatic polyester, in which the sum of the C atoms in the aliphatic polyester chain is at least 8, and an epoxide resin. Crystalline epoxide group-containing adducts of this type are described, for example, in German Offenlegungsschrift No. 1,720,427 and German Offenlegungsschrift No. 1,900,789. These crystalline epoxide group-containing adducts are preferably employed as a mixture with other crystalline epoxide resins which have not been so-called advanced with a polyester, the proportion of the epoxide group-containing adduct preferably being up to 30% by weight, based on the total amount of epoxide resin.

Examples of suitable curing catalysts are imidazole and its derivatives substituted by alkyl, alkenyl, phenyl or benzyl, such as 1-methylimidazole, 2-ethyl-4-methylimidazole, 2-vinylimidazole, 2-phenylimidazole or 2-phenyl-4-methylimidazole, 1-(3-aminopropyl)-imidazole, or tertiary amines, such as diethylaminopropylamine, dimethylaminopropylamine, diethylaminoethylamine, dimethylaminobenzylamine or 1,6-bis-(dimethylamino)-hexane, and also adducts of dimethylaminoalkylamines and glycidyl ethers of aliphatic alcohols or of phenols. Such adducts preferably have the formula I

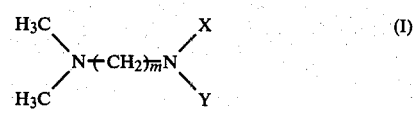

in which m is a number from 3 to 10, X is a grouping of the formula

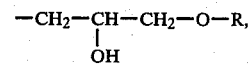

in which R is an alkyl having 4 to 10 C atoms or phenyl which is unsubstituted or substituted by chlorine, bromine or alkyl or alkoxy each having 1 to 3 C atoms, and Y is a hydrogen atom or has the meaning defined for X. Adducts of the formula indicated above are described, for example, in British Pat. No. 1,169,990 and in U.S. Pat. No. 3,332,997.

Further compounds which can also be used as curing catalysts are, for example, those of the formula $(CH_3)_2N-(CH_2)_3NH(CH_2)_3NH_2$, $(CH_3)_2N(CH_2)_3NH(CH_2)_2CN$ or $(CH_3)_2N-(CH_2)_3N(CH_2CH_2CN)_2$, and also piperazine, dicyandiamide, the known $BF_3$ complex compounds, for example the boron trifluoride/monoethylamine complex, adducts of 1 mol of 1-(3-aminopropyl)-imidazole and 1 or 2 mols of glycidyl ethers of aliphatic alcohols or of phenols or adducts of 1 mol of 2-ethyl-4-methylimidazole, 2-methylimidazole or imidazole and 1 mol of glycidyl ethers of aliphatic alcohols or of a phenol. These adducts can likewise be prepared by the process described in British Pat. No. 1,169,990.

Compounds preferably used as the curing catalyst are the adducts of the formula I or the adducts of 1 mol of 2-ethyl-4-methylimidazole, 2-methylimidazole or imidazole and 1 mol of glycidyl ethers of aliphatic alcohols or of a phenol. In particular, the adducts of the formula I in which m is 3 and X, Y and R are as defined are used.

Preferably, the one-component system according to the invention contains the curing catalyst fused in the crystalline epoxide resin. One-component systems of this type are prepared in a simple manner by mixing the crystalline epoxide resin intensively in the melt with the curing catalyst and then allowing the melt to cool to room temperature and to crystallise out. A very homogeneous distribution of the curing catalyst in the crystalline epoxide resin is obtained in this way.

For the preparation of, for example, adhesive tapes or prepregs from the one-component systems according to the invention, it is advantageous to saturate or to coat the corresponding fabric or non-woven with the melt of the one-component systems. Substrates on which an adhesive bond is to be produced, such as metals, ceramics, glass, plastics, wood and the like, can also be pre-treated with the melt of the one-component system in the same way.

The crystalline one-component systems according to the invention are also suitable for the preparation of prepregs by the application of the crystalline powder to non-wovens of, for example, nylon, polyester or glass fibres and subsequent incorporation by sintering, rolling or compressing.

The crystalline one-component systems can also be processed in the conventional manner to granules or to tablets, small rods and the like.

If the curing catalyst used is in the form of a powder, the one-component systems according to the invention can also be prepared by finely grinding or intensively mixing the crystalline epoxide resin with the corresponding curing catalyst. One-component systems of this type likewise have very good storage stability, but the distribution of the curing catalyst in the epoxide resin which is obtained in this way is less homogeneous than that in the one-component systems which are obtained by mixing the curing catalyst with the molten epoxide resins.

The one-component systems according to the invention can be mixed with the customary additives conventionally used in the field of epoxide resins, such as fillers, plasticisers or pigments, but these additives must be solid and preferably crystalline substances. Especially when the one-component systems according to the invention are used as adhesives, thermoplastics in powder form are preferably added thereto. The proportion of such thermoplastic powders can be up to 30% by weight, based on the epoxide resin/catalyst mixture. Preferably, the adhesives contain 5 to 20% by weight of a thermoplastic powder. Thermoplastics used are in particular ABS graft polymers or copolymers of ethylene, acrylic acid and/or acrylates. Plasticisers and flexibilising agents which can be added to the one-component systems are advantageously the crystalline, long-chain polyesters which are described, for example, in British Pat. No. 1,164,584 or in "Die Angewandte Makromolekulare Chemie" ("Applied Macromolecular Chemistry"), 1973, pages 349–412.

The one-component systems according to the invention are suitable for producing an adhesive bond on a wide variety of materials, such as metals, ceramics, glass, wood and plastics, in particular also including those which have relatively low softening points, such as ABS polymers, polyethylene and PVC.

In principle, the one-component systems according to the invention can also be used as casting or laminating resins, as compression moulding compositions or as sintering powders for powder-coating by the whirl-sintering process.

As mentioned initially, the one-component systems according to the invention are distinguished by long storage lives and also have the advantage that no separation can take place during storage. The crystalline one-component systems are also characterised by a sharp melting point, have low viscosities above the melting point and display good wetting with metallic and non-metallic materials.

Moreover, rapid curing at relatively low temperatures can be achieved with the one-component systems according to the invention.

In the examples which follow parts are by weight; percentages are by weight unless indicated otherwise. Preparation of adducts which contain epoxide groups and are based on polyester-dicarboxylic acids.

A. Preparation of the polyester-dicarboxylic acids.

POLYESTER-DICARBOXYLIC ACID 1

1,414 g of sebacic acid and 750 g of 1,6-hexanediol (molar ratio 11:10) were heated to 135° C. under a nitrogen atmosphere and the temperature was further raised to 228° C. in the course of 7 hours, with stirring, the water formed during the polycondensation reaction being distilled off continuously. The residual moisture content was then removed at 230° C. under $2 \times 10^3$ Pa. The resulting acid polyester is a product which is crystalline at room temperature and has a melting point of 54° C. and an acid equivalent weight of 1,550 (theoretical value: 1,521).

POLYESTER-DICARBOXYLIC ACID 2

1,899.3 g of adipic acid and 1,475 g of 1,6-hexanediol (molar ratio 26:25) were heated to 136° C. under nitrogen and the temperature was further raised to 170° C. in the course of 9 hours, with stirring, the water formed during the polycondensation reaction being distilled off continuously. The residual moisture content was then removed at 175° C. under $2.4 \times 10^3$ Pa. The resulting acid polyester is a product which is crystalline at room temperature and has a melting point of 55° C. and an acid equivalent weight of 1,665 (theoretical value: 2,924).

POLYESTER-DICARBOXYLIC ACID 3

708 g of succinic acid and 509.6 of 1,4-butanediol (molar ratio 11:10) were heated at 200° C. for 5 hours, under nitrogen. The water formed during the esterification reaction was distilled off continuously. The final traces of moisture were removed in vacuo ($1.8 \times 10^3$ Pa) at 210° C. in the course of 1½ hours. The acid polyester formed is a product which is crystalline at room temperature and has several melting peaks at 64°, 88°, 100° and 109° C. and an acid equivalent weight of 984 (theoretical value: 924).

POLYESTER-DICARBOXYLIC ACID 4

2,191.5 g of adipic acid, 1,720 g of 1,6-hexanediol (molar ratio 35:34), 11.7 g (0.3% by weight) of a catalyst of the formula

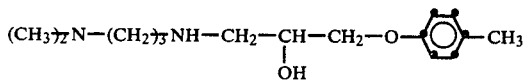

and 11.7 g of di-n-octadecyl 3,5-di-tert.-butylbenzyl-phosphonate as the stabiliser were heated at 160° C. under a nitrogen atmosphere and in the course of 6 hours 455 g of water were distilled off continuously. The residual moisture was then removed at 185° C. under $2 \times 10^3$ Pa. The resulting acid polyester is a product which is crystalline at room temperature and has a melting point of 52° C. and an acid equivalent weight of 2,678 (theoretical value: 3,951).

POLYESTER-DICARBOXYLIC ACID 5

295 g of succinic acid and 180.2 g of 1,4-butanediol (molar ratio 5:4) were heated at 170° C. for 5 hours, under nitrogen. The water formed during the esterification reaction was distilled off continuously. The final traces of moisture were removed in vacuo ($2 \times 10^3$ Pa) at 160° C. in the course of 1¼ hours. The acid polyester formed is a product which is crystalline at room temperature and has several melting peaks at 72, 81 and 95° C. and an acid equivalent weight of 396 (theoretical value: 403).

B. Preparation of the adducts containing epoxide groups

ADDUCT I 155 g of polyester-dicarboxylic acid 1 and 28.6 g of diglycidyl terephthalate (melting point 102° C.) with an epoxide content of 6.9 equivalents/kg (corresponding to a molar ratio of 1:2) were allowed to react under a $N_2$ atmosphere for 2 hours at 140° C., with stirring. The resulting adduct I is a crystalline product with a melting point of 82° C. and an epoxide equivalent weight of 1,240.

ADDUCT II 333 g of polyester-dicarboxylic acid 2 and 61 g of diglycidyl isophthalate (melting point=67° C.) with an epoxide content of 6.8 equivalents/kg (corresponding to a molar ratio of 1:2) were allowed to react under a nitrogen atmosphere for 2 hours at 160° C., with stirring. The resulting adduct II is crystalline at room temperature and has a melting point of 51° C. and an epoxide equivalent weight of 2,040.

ADDUCT III 181 g of polyester-dicarboxylic acid 2 and 58 g of diglycidyl terephthalate (melting point=102° C.) with an epoxide content of 6.9 equivalents/kg (corresponding to a molar ratio of 1:4) were allowed to react under $N_2$ for 2 hours at 160° C., with stirring. The resulting adduct III is an epoxide resin which is crystalline at room temperature and has a melting point of 46° C. and an epoxide equivalent weight of 962.

ADDUCT IV 591 g of polyester-dicarboxylic acid 3 and 176.5 g of diglycidyl isophthalate (corresponding to a molar ratio of 1:2) were allowed to react under $N_2$ for 2 hours at 160° C., with stirring. The resulting adduct IV is crystalline and has two melting peaks at 84° and 99° C. and an epoxide equivalent weight of 1,750.

ADDUCT V 197 g of polyester-dicarboxylic acid 3 and 58 g of diglycidyl terephthalate (corresponding to a molar ratio of 1:2) were allowed to react under $N_2$ for 3 hours at 160° C., with stirring. The resulting adduct V is crystalline and has two melting peaks at 80° and 95° C. and an epoxide equivalent weight of 1,960.

ADDUCT VI 197 g of polyester-dicarboxylic acid 3 and 63.5 g of diglycidyl hexahydrophthalate (corresponding to a molar ratio of 1:2) were allowed to react under $N_2$ for 3 hours at 160° C., with stirring. The resulting adduct is crystalline and has two melting peaks at 85° and 100° C. and an epoxide equivalent weight of 2,440.

ADDUCT VII 268 g of polyester-dicarboxylic acid 4 with a molecular weight of 5,356 and 74 g of bisphenol A diglycidyl ether with an epoxide content of 5.4 equivalents/kg (corresponding to a molar ratio of 1:4) were allowed to react under a nitrogen atmosphere for 2 hours at 160° C., with stirring. The resulting adduct is crystalline and has a melting point of 43° C. and an epoxide equivalent weight of 1,220.

ADDUCT VIII 1,914 g of polyester-dicarboxylic acid 4 and 592 g if bisphenol A diglycidyl ether with an epoxide content of 5.41 equivalents/kg (corresponding to a molar ratio of 1:4) were allowed to react under nitrogen for 3 hours at 140° C., with stirring. The resulting adduct is crystalline and has a melting point of 42° C. and an epoxide equivalent weight of 1,408.

ADDUCT IX 119 g of polyester-dicarboxylic acid 5 and 134 g of diglycidyl isophthalate with an epoxide content of 6.7 equivalents/kg (corresponding to a molar ratio of 1:3) were allowed to react under nitrogen for 2 hours at 160° C., with stirring. The resulting adduct is crystalline and has two melting peaks at 55° and 72° C. and an epoxide equivalent weight of 538.

EXAMPLE 1

100 g of diglycidyl terephthalate (melting point: 102° C.) with an epoxide content of 6.9 equivalents/kg are mixed with 4 g of 1-methylimidazole at 110° C. and the mixture is poured into a porcelain dish which has been pre-warmed to 100° C. A nylon non-woven ("Cerex 7506"; weight 25 g/m²) from Monsanto is drawn through this mixture. There is a constriction above the dish in order to strip off excess resin. The impregnated non-woven is stored at room temperature and the resin crystallises out within a short time. An adhesive film which is stable on storage is obtained; the following properties are determined for this film:

| | |
|---|---|
| Gel time at 100° C. | = 3 minutes |
| Peel strength according to BS (*) DTD 5577 (curing: 20 minutes at 100° C.) | = 1.9 N/mm |

(*) = British Standard

EXAMPLE 2

100 g of diglycidyl terephthalate as in Example 1 are mixed with 4 g of a curing catalyst of the following constitution

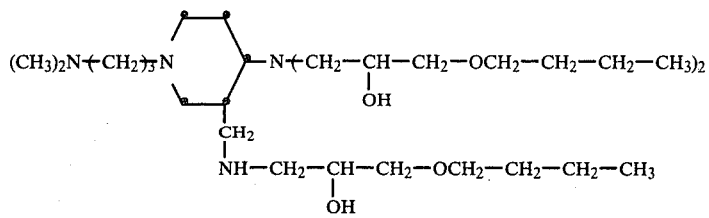

at 100°–110° C. and the mixture is then poured onto an aluminium sheet. The mixture crystallises rapidly and can be powdered. Using this powder, the following adhesive bonds were produced and the following measurements were carried out:

In order to determine the torsional adhesive strength, an adhesive bond is produced between aluminium plugs in accordance with the method for measurements with the "Twist-o-Meter" (Epprecht, Instruments and Controls, Bassersdorf, Switzerland). For this purpose, the powder is heated at 120° C., with stirring, until a viscous solution is obtained. 5 adhesive bonds are produced using the solution, which has been cooled to room temperature, and these bonds are then cured by heating at 140° C. for 2 hours.

| | |
|---|---|
| Torsional adhesive strength (Twist-o-Meter) | = 65 N/mm² |
| Torsional adhesive strength (Twist-o-Meter; adhesive bond produced with a powder stored at room temperature for 8 months) | = 79 N/mm² |
| Gel time of the powder at 130° C. after storing for 16 months at room temperature | = 90 seconds |

Preparation of the curing catalyst employed above 42.8 g (0.2 mol) of 1-dimethylaminopropyl-3-aminomethyl-4-aminopiperidine are initially introduced into a sulfonation flask and warmed to 90° C. under a nitrogen atmosphere. Without any further supply of heat, 90.0 g (0.6 mol) of butyl glycidyl ether with an epoxide content of 6.67 equivalents/kg, which corresponds to a molar ratio of 1:3, are added dropwise in the course of 27 minutes, with stirring. During this addition the temperature of the reaction mixture rises to 155° C. as a result of the exothermic reaction. The reaction product is then kept at 140° C. for a further 2 hours. After cooling, a clear liquid of moderate viscosity is obtained.

| Elementary analysis: | |
|---|---|
| Theory | Found |
| C = 63.5% | C = 62.2% |
| H = 11.3% | H = 11.6% |
| N = 9.3% | N = 9.6% |
| O = 15.8% | O = 16.3% |

EXAMPLE 3

100 g of diglycidyl terephthalate as in Example 1, 25 g of ABS powder ("Novadur", particle size 250μ, from Bayer), 4 g of 2-ethyl-4-methylimidazole and 0.2 g of β-copper phthalocyanine are mixed at 110° C. and the mixture is absorbed onto a polyester non-woven ("Freudenberg" 85591) and allowed to crystallise, using the procedure described in Example 1. The following properties are determined for the adhesive film:

| | |
|---|---|
| Gel time at 130° C. | = 2 minutes |
| Peel strength according to BS DTD 5577 (curing: 20 minutes at 120° C.) | = 4 N/mm |
| Tensile shear strength according to DIN (**) 53283 (curing: 20 minutes at 120° C.) | = 18 N/mm² |

DIN (**) = Deutsche Industrie-Norm (German Industrial Standard)

The tensile shear strength was determined on aluminium sheets (Antikorodal 100 B) stuck with a 12 mm overlap. Polished aluminium sheets degreased with acetone were used when producing the adhesive bond with the adhesive film prepared above.

COMPARISON EXAMPLE 100 g of a bisphenol A diglycidyl ether which is liquid at room temperature and has an epoxide content of 5.4 equivalents/kg are mixed at room temperature with 2 g of 2-ethyl-4-methylimidazole. The following properties are determined for this mixture:

| | |
|---|---|
| Gel time of the fresh mixture at 100° C. | = 18 minutes |
| Gel time of the fresh mixture at 130° C. | = 4 minutes |
| Pot life at 23° C. | = maximum 24 hours |
| Pot life at 40° C. | = maximum 8 hours |

EXAMPLE 4

100 g of diglycidyl isophthalate (melting point=67° C.) with an epoxide content of 6.8 equivalents/kg are mixed briefly at 70° C. with 4 g of 1-methylimidazole and the mixture is poured into a porcelain dish which has been pre-warmed to 60° C. A nylon non-woven is drawn through this mixture, as described in Example 1, and the resulting coating is allowed to crystallise out at room temperature. The following properties are determined for the adhesive film, which is stable on storage:

| | |
|---|---|
| Gel time at 100° C. | = 140 seconds |
| Peel strength according to BS DTD 5577 (curing: 20 minutes at 100° C.) | = 1.3 N/mm |
| Torsional adhesive strength (Twist-o-Meter; curing: 2 hours at 140° C.) | = 77 N/mm² |
| Torsional adhesive strength (Twist-o-Meter; adhesive bond produced with a powder stored for 8 months at room temperature; curing as above) | = 88 N/mm² |

EXAMPLE 5

80 g of diglycidyl isophthalate as in Example 3, 20 g of ABS powder ("Novadur", particle size 250μ, from Bayer) and 3.2 g of 1-methylimidazole are mixed well at 70° C. and the mixture is absorbed on a nylon non-woven by the procedure described in Example 1. The following properties are determined for the adhesive film, which is stable on storage:

| | |
|---|---|
| Gel time at 100° C. | = 120 seconds |
| Peel strength according to BS DTD 5577 (curing: 20 minutes at 100° C.) | = N/mm |
| Tensile shear strength according to DIN 53282 (curing: 20 minutes at 100° C.) | = 21 N/mm$^2$ |
| Tensile shear strength after storing in water at 23° C. for 10 days | = 20 N/mm$^2$ |
| Tensile shear strength after storing in water at 23° C. for 30 days | = 19 N/mm$^2$ |

The tensile shear strength was determined on polished aluminium sheets which had been degreased with acetone and had a 12 mm overlap.

EXAMPLE 6

85 g of diglycidyl isophthalate as in Example 3, 15 g of ABS powder ("Novadur", particle size 250μ from Bayer) and 3 g of a compound having the following constitution

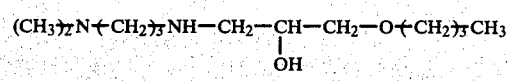

are mixed at 70° C. and the mixture is absorbed on a nylon nonwoven by the procedure described in Example 1. The following properties are determined for the resulting adhesive film, which is stable on storage:

| | |
|---|---|
| Gel time at 100° C. | = 15 minutes |
| Gel time at 130° C. | = 8 minutes |
| Gel time at 100° C. after storing at room temperature for 30 days | = 11 minutes |
| Gel time at 130° C. after storing at room temperature for 30 days | = 1 minute |
| Peel strength according to BS DTD 5577 (curing: 20 minutes at 120° C.) | = 8 N/mm |
| Peel strength after storing at room temperature for 30 days | = 11 N/mm |
| Tensile shear strength according to DIN 53283 (curing: 20 minutes at 120° C.) | = 22 N/mm$^2$ |
| Tensile shear strength after storing at room temperature for 30 days | = 26 N/mm$^2$ |

EXAMPLE 7

90 g of diglycidyl isophthalate as in Example 3, 10 g of ethylene/acrylic acid copolymer powder ("Lupulen" from BASF) and 3.6 g of 1-methylimidazole are mixed at 70° C. and the mixture is absorbed on a nylon non-woven by the procedure described in Example 1 and the non-woven is wound up in a polyethylene film. The adhesive film crystallises rapidly and can readily be separated from the polyethylene film. The following properties were determined for the adhesive film:

| | |
|---|---|
| Gel time at 130° C. | = 2 minutes |
| Peel strength according to BS DTD 5577 (curing: 20 minutes at 100° C.) | = 13 N/mm |

EXAMPLE 8

100 g of diglycidyl isophthalate as in Example 2, 25 g of ethylene/acrylic acid copolymer powder ("Lupulen" from BASF), 4 g of 1-methylimidazole and 0.2 g of β-copper phthalocyanine are mixed at 80° C. and the mixture is absorbed on a nylon non-woven by the procedure described in Example 1 and allowed to crystallise. The following properties are determined for the adhesive film, which is stable on storage:

| | |
|---|---|
| Gel time at 130° C. | = 2 minutes |
| Peel strength according to BS DTD 5577 (curing: 20 minutes at 120° C.) | = 4 N/mm |
| Tensile shear strength according to DIN 53283 (curing: 20 minutes at 120° C.) | = 7 N/mm$^2$ |

EXAMPLE 9

100 g of a diglycidyl ester of the formula

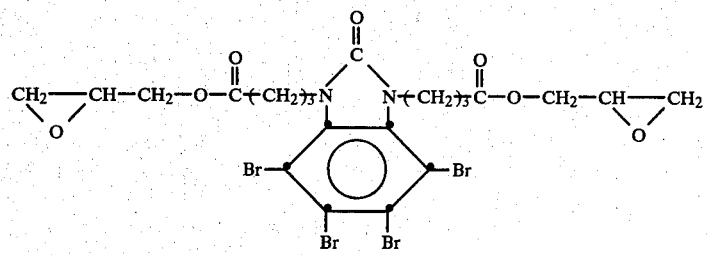

with an epoxide content of 2.5 equivalents/kg and a melting point of 90° C. are mixed at 120° C. with 25 g of ABS powder (Novadur; particle size 250μ) and 4 g of vinylimidazole. The gel time of this mixture at 130° C. is 25 minutes. This mixture is used to impregnate a glass fabric which has been pressed in a Carver press for 30 minutes at 160° C. under a pressure of 18 kg/cm$^2$ to give a laminate.

| | |
|---|---|
| Appearance of the laminate sheet | = pale brown |
| Glass transition temperature (Differential Scanning Calorimeter-1, 16° C./minute) | = 92° C. |
| Combustibility according to Underwriters Laboratories 94 | |
| Combustion time | = 0 seconds |
| Stage | = 94 V-O |

EXAMPLE 10

80 g of a diglycidyl isophthalate and 20 g of adduct I are melted together at 80° C., 2 g of 1-methylimidazole are added and the mixture is absorbed on a nylon non-woven by the procedure described in Example 1. The resin/catalyst mixture crystallises out as a wax-like substance at room temperature. The following properties are determined for the adhesive film, which is stable on storage:

| | |
|---|---|
| Gel time at 100° C. | = 20 minutes |
| Gel time at 140° C. | = 5 minutes |
| Tensile shear strength according to DIN 53283 (curing: 20 minutes at 120° C.) | = 7.4 N/mm² |

EXAMPLE 11

50 g of diglycidyl isophthalate, 5 g of diglycidyl terephthalate and 40 g of adduct II are warmed to 120° C., the mixture is allowed to cool to 90° C., 5 g of ABS powder and 4 g of a curing catalyst of the formula

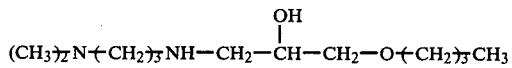

are added and the resulting mixture is absorbed on a nylon non-woven by the procedure described in Example 1. The resin/catalyst mixture crystallises within 9 minutes at room temperature.

| | |
|---|---|
| Gel time at 100° C. | = <15 minutes |
| Tensile shear strength according to DIN 53283 (curing: 20 minutes at 120° C.) | = 8.3 N/mm² |
| Peel strength according to BS DTD 5577 (curing: 20 minutes at 120° C.) | = 9.0 N/mm |

EXAMPLE 12

70 g of diglycidyl isophthalate and 20 g of adduct II are melted together at 80° C., 10 g of ABS powder and 1 g of talc powder are mixed in and 4 g of a catalyst of the formula

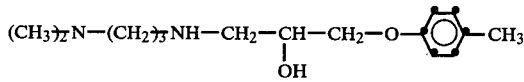

are added and the resulting mixture is absorbed on a nylon non-woven by the procedure described in Example 1. The resin/catalyst mixture crystallises within 12 minutes at room temperature.

| | |
|---|---|
| Gel time at 100° C. | = >20 minutes |
| Gel time at 140° C. | = 14 minutes |
| Tensile shear strength according to DIN 53283 (curing: 20 minutes at 120° C.) | = 25.0 N/mm² |
| Peel strength according to BS DTD 5577 (curing: 20 minutes at 120° C.) | = 11.2 N/mm |

EXAMPLE 13

50 g of diglycidyl terephthalate and 50 g of adduct III are mixed at 120° C., the mixture is allowed to cool to 100° C., 4 g of the catalyst used in Example 6 are added and the resulting mixture is absorbed on a nylon non-woven by the procedure described in Example 1. The recrystallisation time at room temperature is less than one minute.

| | |
|---|---|
| Gel time at 100° C. | = 15 minutes |
| Tensile shear strength according to DIN 53283 (curing: 20 minutes at 120° C.) | = 15.0 N/mm² |
| Peel strength according to BS DTD 5577 (curing: 20 minutes at 120° C.) | = 11.0 N/mm |

EXAMPLE 14

80 g of diglycidyl terephthalate and 20 g of adduct III are mixed at 120° C., the mixture is cooled to 100° C., 2 g of the catalyst according to Example 10 are added and the resulting mixture is absorbed on a nylon non-woven by the procedure described in Example 1. The recrystallisation time at room temperature is less than 3 minutes.

| | |
|---|---|
| Gel time at 100° C. | = 16 minutes |
| Gel time at 140° C. | = 4 minutes |
| Tensile shear strength according to DIN 53283 (curing for 20 minutes at 120° C.) | = 22.1 N/mm² |

EXAMPLE 15

70 g of diglycidyl terephthalate and 20 g of adduct IV are mixed at 120° C., 10 g of ABS powder and 4 g of the catalyst employed in Example 6 are mixed in and the resulting mixture is absorbed on a nylon non-woven by the procedure described in Example 1. The recrystallisation time is less than 3 minutes at room temperature.

| | |
|---|---|
| Gel time at 100° C. | = 20 minutes |
| Gel time at 140° C. | = 5 minutes |
| Tensile shear strength according to DIN 53283 (curing: 20 minutes at 120° C.) | = 23.8 N/mm² |
| Peel strength according to BS DTD 5577 (curing: 20 minutes at 120 C.) | = 9.1 N/mm |

EXAMPLE 16

100 g of adduct V are warmed to 120° C., 2 g of the catalyst used in Example 6 are added and the resulting mixture is absorbed on a nylon non-woven by the procedure described in Example 1. The recrystallisation time at room temperature is less than 1 minute.

| | |
|---|---|
| Gel time at 100° C. | = 18 minutes |
| Gel time at 140° C. | = 2 minutes |
| Tensile shear strength according to DIN 53283 (curing: 20 minutes at 120° C.) | = 6.5 N/mm² |

EXAMPLE 17

80 g of diglycidyl terephthalate and 20 g of adduct V are melted together at 120° C., 4 g of the catalyst used in Example 6 are mixed in and the resulting mixture is absorbed on a nylon non-woven by the procedure described in Example 1. The recrystallisation time is less than 1 minute at room temperature.

| | |
|---|---|
| Gel time at 100° C. | = 20 minutes |
| Gel time at 140° C. | = 6 minutes |
| Tensile shear strength according to DIN 53283 (curing: 20 minutes at 120° C.) | = 26.4 N/mm² |
| Peel strength according to BS DTD 5577 (curing: 20 minutes at 120° C.) | = 8.4 N/mm |

EXAMPLE 18

80 g of diglycidyl terephthalate and 20 g of adduct VI are mixed together at 120° C., 2 g of 2-ethyl-4-methylimidazole are added and the resulting mixture is absorbed on a nylon non-woven by the procedure described in Example 1. The mixture recrystallises within 1 minute at room temperature.

| | |
|---|---|
| Gel time at 100° C. | = 5 minutes |
| Gel time at 140° C. | = 1½ minutes |
| Tensile shear strength according to | |
| DIN 53283 (curing: 20 minutes at 120° C.) | = 20.8 N/mm² |

EXAMPLE 19

100 g of diglycidyl terephthalate and 20 g of adduct VII are warmed to 110° C., 3 g of the catalyst used in Example 12 are added and the resulting mixture is absorbed on a nylon non-woven by the procedure described in Example 1. The resin/catalyst mixture crystallises within 30 seconds at room temperature. An adhesive film which is stable on storage is obtained and the following properties are determined for this film:

| | |
|---|---|
| Gel time at 100° C. | = 67 minutes |
| Gel time at 130° C. | = 47 minutes |

After curing for 30 minutes at 140° C., the following properties are determined:

| | |
|---|---|
| Tensile shear strength according to | |
| DIN 53283 | = 23.0 N/mm² |
| Tensile shear strength according to | |
| DIN 53283 after RT storage for 30 days | |
| (RT = room temperature) | = 29.6 N/mm² |
| Peel strength according to BS DTD 5577 | = 9.1 N/mm |
| Peel strength according to BS DTD 5577 | |
| after RT storage for 30 days | = 12.4 N/mm |

A portion of the curable resin mixture prepared above is poured into aluminium moulds (145×145×4 mm) and cured for 4 hours at 100° C. and for 12 hours at 150° C. The resulting mouldings have the following properties:

| | |
|---|---|
| Heat distortion point according to | |
| ISO[xxx] R 75 | = 86° C. |
| Flexural strength according to | |
| VSM[xxxx] 77103 | = 105 N/mm² |
| Deflection according to VSM 77103 | = 7.2 mm |
| Impact strength according to VSM 77105 | = 11.5 N/mm |
| Absorption of water at 23° C. after 24 hours | = 0.5% by weight |
| Absorption of boiling water after 24 hours | = 3.3% by weight |

[xxx]ISO = International Standards Organisation Recommendation
[xxxx]VSM = Verein Schweizerischer Maschinenindustrieller.

EXAMPLE 20

100 g of diglycidyl isophthalate, 20 g of adduct III, 10 g of ABS powder (as used in Example 5), 0.2 g of 2-copper phthalocyanine and 3 g of the catalyst used in Example 12 are mixed at 80° C. and a portion of this mixture is absorbed on nylon non-woven by the procedure described in Example 1. The recrystallisation time at room temperature is about 10 minutes. The following properties are determined for the adhesive film, which is stable on storage:

| | |
|---|---|
| Gel time at 100° C. | = 46 minutes |
| Gel time at 130° C. | = 25 minutes |
| Tensile shear strength according to | |
| DIN 53282 (curing: 30 minutes at 140° C.) | = 24 N/mm² |
| Peel strength according to BS DTD 5577 | |
| (curing: 30 minutes at 140° C.) | = 11 N/mm |

The other portion of the curable mixture prepared above is poured into pre-warmed aluminium moulds and cured for 4 hours at 100° C. and for 12 hours at 160° C. The following properties are determined for the cured moulded sheet:

| | |
|---|---|
| Flexural strength (VSM 77103) | = 104 N/mm² |
| Deflection (VSM 77103) | = 5.9 mm |
| Impact strength (VSM 77105) | = 12 N/mm |
| Heat distortion point (ISO R 75) | = 78° C. |
| Absorption of water after storing | |
| in water at 23° C. for 4 days | = 40.3% by weight |

EXAMPLE 21

100 g of diglycidyl terephthalate, 5 g of adduct VIII and 3 g of the catalyst used in Example 12 are mixed at 110° C. and a portion of this mixture is absorbed on nylon non-woven by the procedure described in Example 1.

The recrystallisation time at room temperature is less than 1 minute. The following properties are determined for the adhesive film, which is stable on storage:

| | |
|---|---|
| Gel time at 130° C. | = 80 minutes |
| Tensile shear strength | = 26 N/mm² |
| (curing: 60 minutes at 140° C.) | |
| Peel strength | = 9 N/mm |
| (curing: 60 minutes at 140° C.) | |
| After 30 days at >65% AH[(x)] (23° C.) | = 9 N/mm |
| After 60 days at >65% AH (23° C.) | = 6 N/mm |

[(x)]AH = atmospheric humidity.

The other portion of the curable mixture prepared above is poured into pre-warmed aluminium moulds and cured for 4 hours at 100° C. and for 12 hours at 160° C. The mouldings have the following properties:

| | |
|---|---|
| Flexural strength (VSM 77103) | = 132 N/mm² |
| Deflection (VSM 77103) | = 8.3 mm |
| Impact strength (VSM 77105) | = 20 N/mm |
| Heat distortion point (ISO R 75) | = 101° C. |
| Absorption of water after storing | |
| in water at 23° C. for 4 days | = 0.48% by weight |

EXAMPLE 22

100 g of diglycidyl terephthalate, 20 g of adduct VIII and 3 g of the catalyst used in Example 12 are mixed at 110° C. and a portion of this mixture is absorbed on nylon non-woven by the procedure described in Example 1. The recrystallisation time at room temperature is less than 1 minute. The following properties are determined for the adhesive film, which is stable on storage:

| | |
|---|---|
| Gel time at 100° C. | = 67 minutes |
| Gel time at 130° C. | = 47 minutes |
| Tensile shear strength | = 23 N/mm² |
| (curing: 30 minutes at 140° C.) | |

| | |
|---|---|
| After RT storage in the dry state for 30 days | = 30 N/mm² |
| After RT storage in the dry state for 60 days | = 26 N/mm² |
| After RT storage in the dry state for 90 days | = 26 N/mm² |
| Peel strength | = 9 N/mm |
| After RT storage in the dry state for 30 days | = 12 N/mm |
| After RT storage in the dry state for 60 days | = 11 N/mm |
| After RT storage in the dry state for 90 days | = 5 N/mm |

The other portion of the curable mixture prepared above is poured into pre-warmed aluminium moulds and cured for 4 hours at 100° C. and for 12 hours at 160° C. The mouldings have the following properties:

| | |
|---|---|
| Flexural strength (VSM 77103) | = 105 N/mm² |
| Deflection (VSM 77103) | = 7.2 mm |
| Impact strength (VSM 77105) | = 12 N/mm |
| Heat distortion point (ISO R 75) | = 86° C. |
| Absorption of water after storing in water at 23° C. for 4 days | = 0.50% by weight |

EXAMPLE 23

100 g of diglycidyl terephthalate, 25 g of adduct VIII and 3 g of the catalyst used in Example 12 are mixed at 110° C. and a portion of this mixture is absorbed on a nylon non-woven by the procedure described in Example 1. The recrystallisation time at room temperature is less than 1 minute. The following properties are determined for the adhesive film, which is stable on storage:

| | |
|---|---|
| Gel time at 100° C. | = 22 minutes |
| Gel time at 130° C. | = 22 minutes |
| Tensile shear strength | = 24 N/mm² |
| (curing: 30 minutes at 140° C.) | |
| Peel strength | = 7 N/mm |
| (curing: 30 minutes at 140° C.) | |
| After 30 days at >65% AH[(x)] at 23° C. | = 8 N/mm |
| After 60 days at >65% AH at 23° C. | = 7 N/mm |

[(x)]AH = atmospheric humidity.

The other portion of the curable mixture prepared above is poured into pre-warmed aluminium moulds and cured for 4 hours at 100° C. and for 12 hours at 160° C. The resulting mouldings have the following properties:

| | |
|---|---|
| Flexural strength (VSM 77103) | = 102 N/mm² |
| Deflection (VSM 77103) | = 10.8 mm |
| Impact strength (VSM 77105) | = 8 N/mm |
| Heat distortion point (ISO R 75) | = 54° C. |
| Absorption of water after storing in water at 23° C. for 4 days | = 0.84% by weight |

EXAMPLE 24

100 g of diglycidyl terephthalate, 30 g of adduct VIII and 2 g of an adduct of 1 mol of 2-methylimidazole and 1 mol of cresyl glycidyl ether are mixed at 110° C. and the mixture is absorbed on a nylon non-woven by the procedure described in Example 1. The recrystallisation time at room temperature is less than 1 minute. The following properties are determined for the adhesive film, which is stable on storage:

| | |
|---|---|
| Gel time at 140° C. after RT storage for 12 days | = 30 minutes |
| Gel time at 180° C. after RT storage for 12 days | = 8 minutes |
| Torsional adhesive strength after RT storage for 18 days (curing: 10 minutes at 180° C.) | = 5 N/mm² |
| Tensile shear strength after RT storage for 30 days (curing: 30 minutes at 200° C.) | = 25 N/mm² |

EXAMPLE 25

100 g of diglycidyl terephthalate, 20 g of adduct VIII and 2 g of an adduct of 1 mol of 2-ethyl-4-methylimidazole and 1 mol of cresyl glycidyl ether are mixed at 110° C. and the mixture is absorbed on a nylon non-woven by the procedure described in Example 1. The recrystallisation time at room temperature is less than 1 minute. The following properties are determined for the adhesive film, which is stable on storage:

| | |
|---|---|
| Gel time at 180° C. after RT storage for 26 days | = 90 seconds |
| Torsional adhesive strength after RT storage for 18 days (curing: 10 minutes at 180° C.) | = 39 N/mm² |
| Torsional adhesive strength after RT storage for 18 days (curing: 10 minutes at 200° C.) | = 51 N/mm² |
| Tensile shear strength after RT storage for 30 days (curing: 30 minutes at 200° C.) | = 20 N/mm² |

EXAMPLE 26

100 g of diglycidyl terephthalate, 10 g of adduct VIII and 2 g of an adduct of 2 mols of cresyl glycidyl ether and 1 mol of the compound having the following structure:

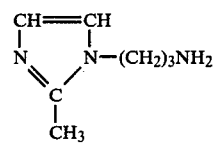

as the catalyst are mixed at 110° C.

The recrystallisation time at room temperature is less than 1 minute. The following properties are determined for the adhesive film, which is stable on storage:

| | |
|---|---|
| Gel time at 140° C. after RT storage for 26 days | = 60 minutes |
| Gel time at 180° C. after RT storage for 26 days | = 17 minutes |
| Tensile shear strength after RT storage for 30 days (curing: 30 minutes at 200° C.) | = 24 N/mm² |

EXAMPLE 27

100 g of diglycidyl terephthalate, 20 g of adduct VIII and 4 g of piperazine are mixed together at 110° C., the temperature of the reaction mixture rising to 160° C. as a result of the heat evolved in the exothermic reaction.

The recrystallisation time at room temperature is 9 minutes. The following properties are determined for the adhesive film:

| | |
|---|---|
| Gel time at 100° C. after RT storage for 35 days | = 30 minutes |
| Gel time at 140° C. after RT storage for 35 days | = 12 minutes |
| Tensile shear strength after RT storage for 40 days (curing: 30 minutes at 200° C.) | = 22 N/mm² |

EXAMPLE 28

100 g of diglycidyl terephthalate, 20 g of adduct IX and 3 g of dicyandiamide are mixed together at 110° C. and the mixture is absorbed on a non-woven by the procedure described in Example 1. The recrystallisation time at room temperature is less than 1 minute. The following properties are determined for the adhesive film, which is stable on storage:

| | |
|---|---|
| Gel time at 140° C. after RT storage for 35 days | = 28 minutes |
| Gel time at 180° C. after RT storage for 35 days | = 5 minutes |
| Tensile shear strength after RT storage for 40 days (curing: 30 minutes at 200° C.) | = 23 N/mm² |

EXAMPLE 29

100 g of diglycidyl terephthalate, 3 g of Aerosil (380 m²/g), 0.1 g of ethylene glycol and 4 g of dicyandiamide (extremely fine) are added together at 110° C. and mixed and the mixture is absorbed on a nylon non-woven by the procedure described in Example 1. The recrystallisation time at room temperature is less than 1 minute. The following properties are determined for the adhesive film, which is stable on storage:

| | |
|---|---|
| Gel time at 160° C. after RT storage for 23 days | = 18 minutes |
| Gel time at 180° C. after RT storage for 23 days | = 4 minutes |
| Torsional adhesive strength after RT storage for 18 days (curing: 10 minutes at 200° C.) | = 14 N/mm² |
| Tensile shear strength after RT storage for 30 days (curing: 30 minutes at 200° C.) | = 18 N/mm² |

EXAMPLE 30

100 g of diglycidyl isophthalate and 3 g of the catalyst used in Example 12 are mixed at 80° C. and a portion of this mixture is applied to a nylon non-woven by the procedure described in Example 1. The recrystallisation time at room temperature is about 10 minutes. The following properties are determined for the adhesive film, which is stable on storage:

| | |
|---|---|
| Gel time at 100° C. | = 50 minutes |
| Gel time at 130° C. | = 26 minutes |
| Tensile shear strength (curing: 30 minutes at 140° C.) | = 24 N/mm² |
| Tensile shear strength after RT storage for 30 days | = 25 N/mm² |
| Peel strength | = 6 N/mm |

| | |
|---|---|
| (curing: 30 minutes at 140° C.) Peel strength after RT storage for 30 days | = 8 N/mm |

A further portion of the curable mixture prepared above is poured into pre-warmed aluminium moulds and cured for 4 hours at 100° C. and for 12 hours at 160° C. The resulting mouldings have the following properties:

| | |
|---|---|
| Flexural strength (VSM 77103) | = 166 N/mm² |
| Deflection (VSM 77103) | = 7.2 mm |
| Impact strength (VSM 77105) | = 21 N/mm |
| Heat distortion point (ISO R 75) | = 109° C. |
| Absorption of water after storing in water at 23° C. for 4 days | = 0.31% by weight |

EXAMPLE 31

100 g of diglycidyl terephthalate, 20 g of adduct VIII and 2 g of piperazine are mixed at 110° C. and a portion of this mixture is applied to a nylon non-woven by the procedure described in Example 1. The recrystallisation time at room temperature is less than 1 minute. The following properties are determined for the adhesive film, which is stable on storage:

| | |
|---|---|
| Gel time at 140° C. after RT storage for 8 days | = 140 minutes |
| Gel time at 180° C. after RT storage for 8 days | = 39 minutes |
| Tensile shear strength after RT storage for 15 days (curing: 30 minutes at 200° C.) | = 29 N/mm² |

EXAMPLE 32

100 g of diglycidyl terephthalate, 10 g of adduct IX and 3 g of the catalyst used in Example 26 are mixed at 110° C. and the mixture is absorbed on a nylon non-woven by the procedure described in Example 1. The recrystallisation time at room temperature is less than 1 minute. The following properties are determined for the adhesive film, which is stable on storage:

| | |
|---|---|
| Gel time at 140° C. after RT storage for 8 days | = 40 minutes |
| Gel time at 180° C. after RT storage for 8 days | = 5½ minutes |
| Tensile shear strength after RT storage for 15 days (curing: 30 minutes at 200° C.) | = 25 N/mm² |

EXAMPLE 33

100 g of diglycidyl isophthalate, 10 g of adduct IX and 3 g of the catalyst used in Example 12 are mixed at 90° C. and a portion of this mixture is absorbed on a nylon non-woven by the procedure described in Example 1. The recrystallisation time at room temperature is about 12 hours. The following properties are measured for the adhesive film:

| | |
|---|---|
| Gel time at 100° C. | = 45 minutes |
| Gel time at 130° C. | = 17 minutes |
| Tensile shear strength | = 24 N/mm² |

-continued

| | |
|---|---|
| (curing: 30 minutes at 140° C.) | |
| Peel strength | = 12 N/mm |
| (curing: 30 minutes at 140° C.) | |

The other portion of the curable mixture is poured into pre-warmed aluminium moulds and cured for 4 hours at 100° C. and for 12 hours at 160° C. The resulting mouldings have the following properties:

| | |
|---|---|
| Flexural strength (VSM 77103) | = 159 N/mm² |
| Deflection (VSM 77103) | = 8.2 mm |
| Impact strength (VSM 77105) | = 26 N/mm |
| Heat distortion point (ISO R 75) | = 91° C. |
| Absorption of water after 4 days at 23° C. | = 0.39% by weight |

EXAMPLE 34

100 g of diglycidyl isophthalate, 20 g of adduct IX, 3 g of the catalyst used in Example 12 and 2 g of γ-glycidyloxypropyltrimethoxysilane are mixed at 90° C. and a portion of this mixture is applied to a nylon non-woven by the procedure described in Example 1. The following properties are determined for the crystalline non-woven:

| | |
|---|---|
| Peel strength (BS DTD 5577) | = 11 N/mm |
| Peel strength after storing for 7 days at 23° C. and >65% AH. | = 10 N/mm |

The other portion of the curable mixture is poured into pre-warmed aluminium moulds and cured for 4 hours at 100° C. and for 12 hours at 160° C. The resulting mouldings have the following properties:

| | |
|---|---|
| Flexural strength (VSM 77103) | = 166 N/mm² |
| Deflection (VSM 77103) | = 9.9 mm |
| Impact strength (VSM 77105) | = 22 N/mm |
| Absorption of water after storing in water at 23° C. for 4 days | = 0.38% by weight |

EXAMPLE 35

100 g of diglycidyl isophthalate, 20 g of adduct IX, 3 g of the catalyst used in Example 12 and 2 g of an adduct of 1 mol of 2-ethyl-4-methylimidazole and 1 mol of γ-glycidyloxypropyltrimethoxysilane are mixed at 90° C. and a portion of this mixture is applied to a nylon non-woven by the procedure described in Example 1. The following properties are determined for the crystalline non-woven:

| | |
|---|---|
| Peel strength | = 12 N/mm |
| (curing: 30 minutes at 140° C.) | |
| Peel strength after storing for 7 days at 23° C. and >65% AH. | = 11 N/mm |

The other portion of the curable mixture is poured into pre-warmed aluminium moulds and cured for 4 hours at 100° C. and for 12 hours at 160° C. The resulting mouldings have the following properties:

| | |
|---|---|
| Flexural strength (VSM 77103) | = 171 N/mm² |
| Deflection (VSM 77103) | = 7.8 mm |
| Impact strength (VSM 77105) | = 11 N/mm |
| Absorption of water after storing in water at 23° C. for 4 days | = 0.37% by weight |

EXAMPLE 36

100 g of diglycidyl isophthalate, 20 g of polyester-dicarboxylic acid 4 as the flexibilising agent and 3 g of an adduct of 1 mol of 2-methylimidazole and 1 mol of butyl glycidyl ether are mixed at 70° C. and the mixture is applied to a nylon non-woven by the procedure described in Example 1. The recrystallisation time at room temperature is less than 1 minute on the non-woven and about 10 minutes for the mixture.

The following properties are determined for the adhesive film, which is stable on storage:

| | |
|---|---|
| Gel time at 140° C. | = 60 minutes |
| Gel time at 180° C. | = 8 minutes |
| Torsional adhesive strength | = 77 N/mm² |
| (curing: 30 minutes at 160° C.) | |

What is claimed is:

1. A curable, solid, one-component epoxy resin system, which is stable on storage at room temperature, consisting essentially of
   (a) a crystalline epoxide resin selected from the group consisting of diglycidyl isophthalate, diglycidyl terephthalate and mixtures thereof, and
   (b) 1 to 12% by weight, based on the resin, of a curing catalyst.

2. A one-component system according to claim 1, which additionally contains a crystalline epoxide group-containing adduct of an acid aliphatic polyester and an epoxide resin.

3. A one-component system according to claim 1, wherein the proportion of curing catalyst is 2 to 8% by weight.

* * * * *